US012721786B1

(12) United States Patent
Houseworth

(10) Patent No.: US 12,721,786 B1
(45) Date of Patent: Sep. 1, 2026

(54) PILL BOTTLE MAGNIFIER DEVICE

(71) Applicant: Patricia Houseworth, Ridgefield, CT (US)

(72) Inventor: Patricia Houseworth, Ridgefield, CT (US)

( * ) Notice: Subject to any disclaimer, the term of this patent is extended or adjusted under 35 U.S.C. 154(b) by 0 days.

(21) Appl. No.: 19/381,713

(22) Filed: Nov. 6, 2025

(51) Int. Cl.
*B65D 83/04* (2006.01)
*A61J 1/03* (2023.01)
*A61J 1/14* (2023.01)
*A61J 1/18* (2023.01)

(52) U.S. Cl.
CPC ............... *A61J 1/03* (2013.01); *A61J 1/1412* (2013.01); *A61J 1/18* (2013.01)

(58) Field of Classification Search
CPC .... B65D 1/0207; B65D 1/0223; B65D 1/025; B65D 43/02; A61J 1/00; A61J 1/03; A61J 1/18; A61J 1/1412
USPC ........ 206/528, 534, 540; 220/662, 664, 665; 359/440, 802
See application file for complete search history.

(56) References Cited

U.S. PATENT DOCUMENTS 4,444,307 A * 4/1984 Jermyn ................ G02C 13/008 134/901
5,261,848 A * 11/1993 Kaplan ................... G09F 19/08 40/410
6,538,828 B1 3/2003 Redmond
6,621,629 B2 9/2003 Blumenthal
7,021,489 B2 4/2006 Wilson
7,630,149 B2 12/2009 Yip
8,335,044 B1 12/2012 Besse
9,851,476 B2 12/2017 Cole
10,624,389 B1 4/2020 Salgado
D976,573 S 1/2023 Flygare
2010/0296273 A1* 11/2010 Lien ................... A47G 19/2227 220/608
2017/0059747 A1* 3/2017 Cole ...................... B65D 11/16
2025/0017422 A1* 1/2025 Gosha ..................... A47J 42/46

FOREIGN PATENT DOCUMENTS

WO WO2009002988 12/2008

* cited by examiner

*Primary Examiner* — Luan K Bui

(57) ABSTRACT

A pill bottle magnifier device includes a jar which can insertably receive a pill bottle. The jar is comprised of a translucent material such that the pill bottle is visible in the jar. Additionally, the translucent material is structured into a convex shape to magnify the label on the pill bottle such that a user can read the label. A base is provided and the jar is coupled to the base and the base rests on a support surface. A lid is positionable upon the jar to contain the pill bottle in the jar. A plurality of lights is each coupled to the lid to emit light outwardly from the jar. Each light of the plurality of lights is directed into the jar when the lid is positioned on the jar to illuminate the label on the jar when the plurality of lights is turned on.

15 Claims, 5 Drawing Sheets

PILL BOTTLE MAGNIFIER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to magnifier devices and more particularly pertains to a new magnifier device for magnifying a label on a pill bottle. The device includes a base and a jar that is attached to the base which is structured to have a convex shape such that the jar can magnify a pill bottle that is positioned in the jar to assist a user with reading a label on the pill bottle. The device includes a lid that is positionable on the jar and plurality of lights, each coupled to the lid, which illuminate an interior of the jar when the lights are turned on to assist the user with reading the label in a darkened environment.

(2) Description of Related Art Including Information Disclosed Under 37 CFR 1.97 and 1.98

The prior art relates to magnifier devices including; a prescription container that includes a cylindrical container which can contain a pill bottle and a lid that is attachable to the cylindrical container and a magnifying glass integrated into the lid to assist with reading a label on the pill bottle; a magnifier device that includes a flexible panel that can be wrapped around a pill bottle which has a magnifying portion for magnifying a label on the pill bottle; a magnifying housing for containers which includes a cylindrical housing that can insertable receive a pill bottle which is constructed of a magnifying material to magnify the pill bottle; a container device that includes a bottle and a magnifying unit that is positionable in the bottle to magnify an object in the bottle. In no instance does the prior art disclose a pill bottle magnifying device that includes a base and a jar coupled to the base which has a convex structure to magnify a pill bottle that is contained in the jar and a lid that is positionable on the jar and plurality of lights coupled to the jar to illuminate the pill bottle.

BRIEF SUMMARY OF THE INVENTION

An embodiment of the disclosure meets the needs presented above by generally comprising a jar which can insertably receive a pill bottle. The jar is comprised of a translucent material such that the pill bottle is visible in the jar. Additionally, the translucent material is structured into a convex shape to magnify the label on the pill bottle such that a user can read the label. A base is provided and the jar is coupled to the base and the base rests on a support surface. A lid is positionable upon the jar to contain the pill bottle in the jar. A plurality of lights is each coupled to the lid to emit light outwardly from the jar. Each light of the plurality of lights is directed into the jar when the lid is positioned on the jar to illuminate the label on the jar when the plurality of lights is turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
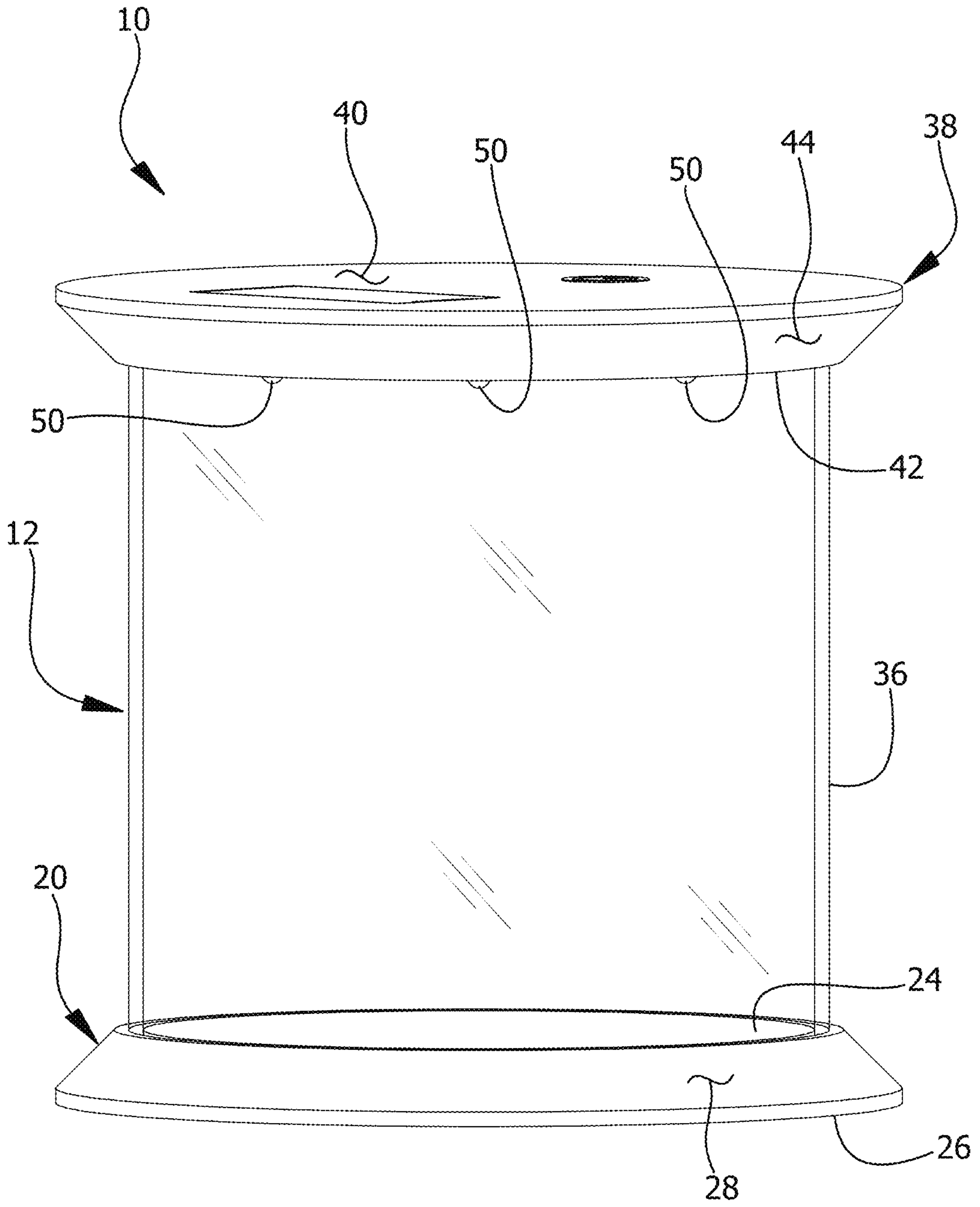
FIG. 1 is a perspective view of a pill bottle magnifier device according to an embodiment of the disclosure.
Figure 2:
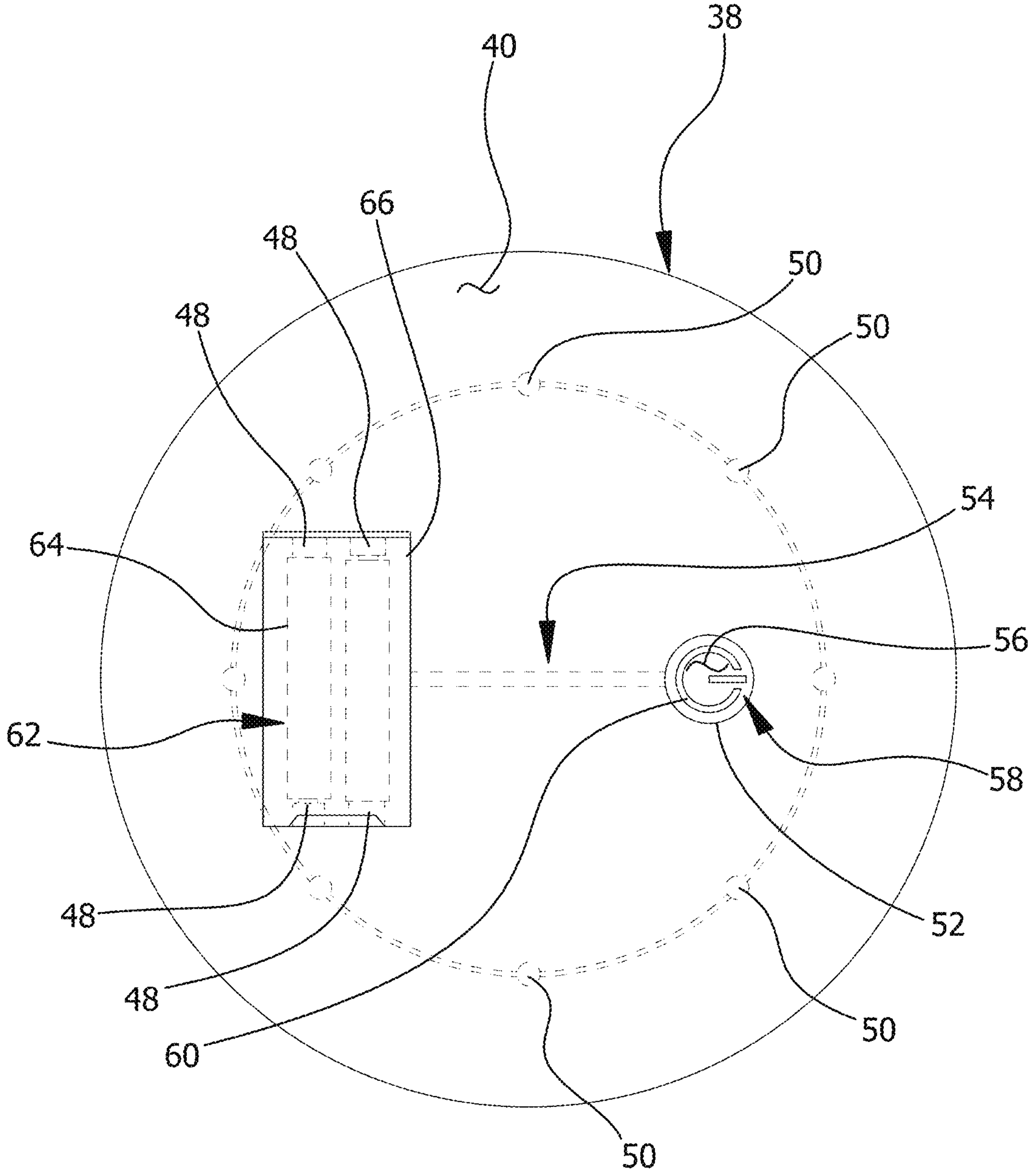
FIG. 2 is a top phantom view of a lid of an embodiment of the disclosure.
Figure 3:
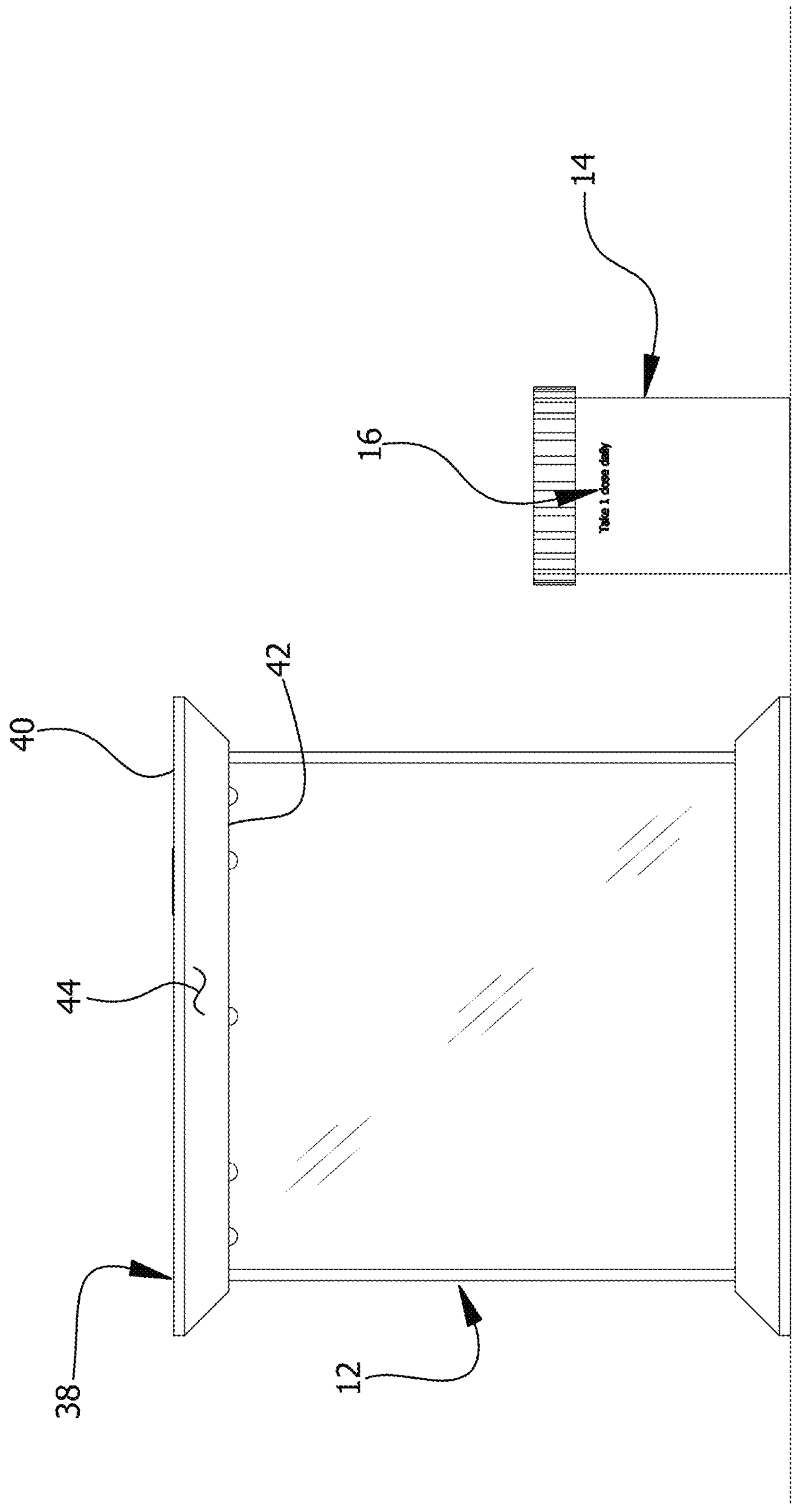
FIG. 3 is a front perspective view of an embodiment of the disclosure.
Figure 4:
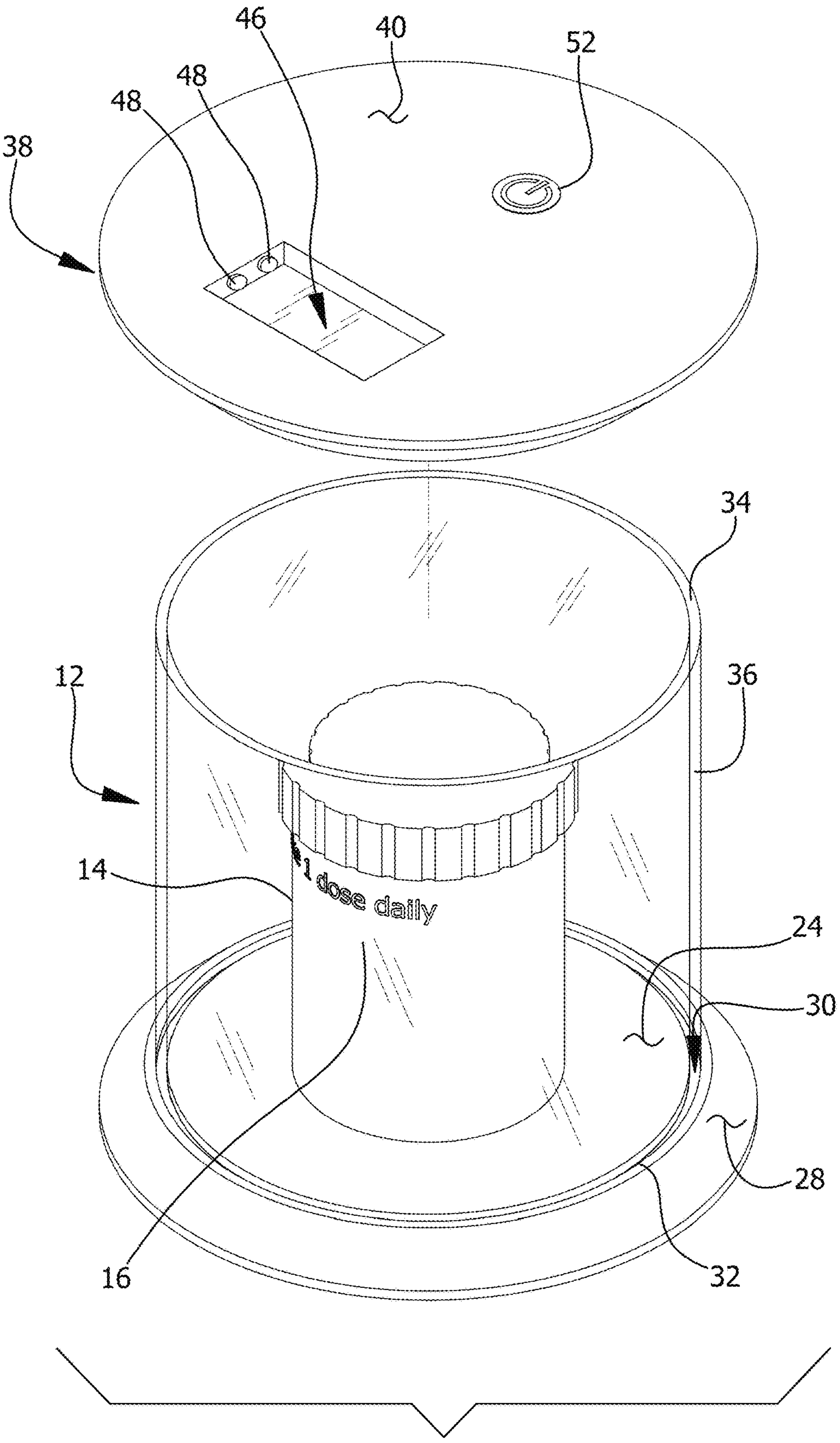
FIG. 4 is an exploded perspective view of an embodiment of the disclosure.
Figure 5:
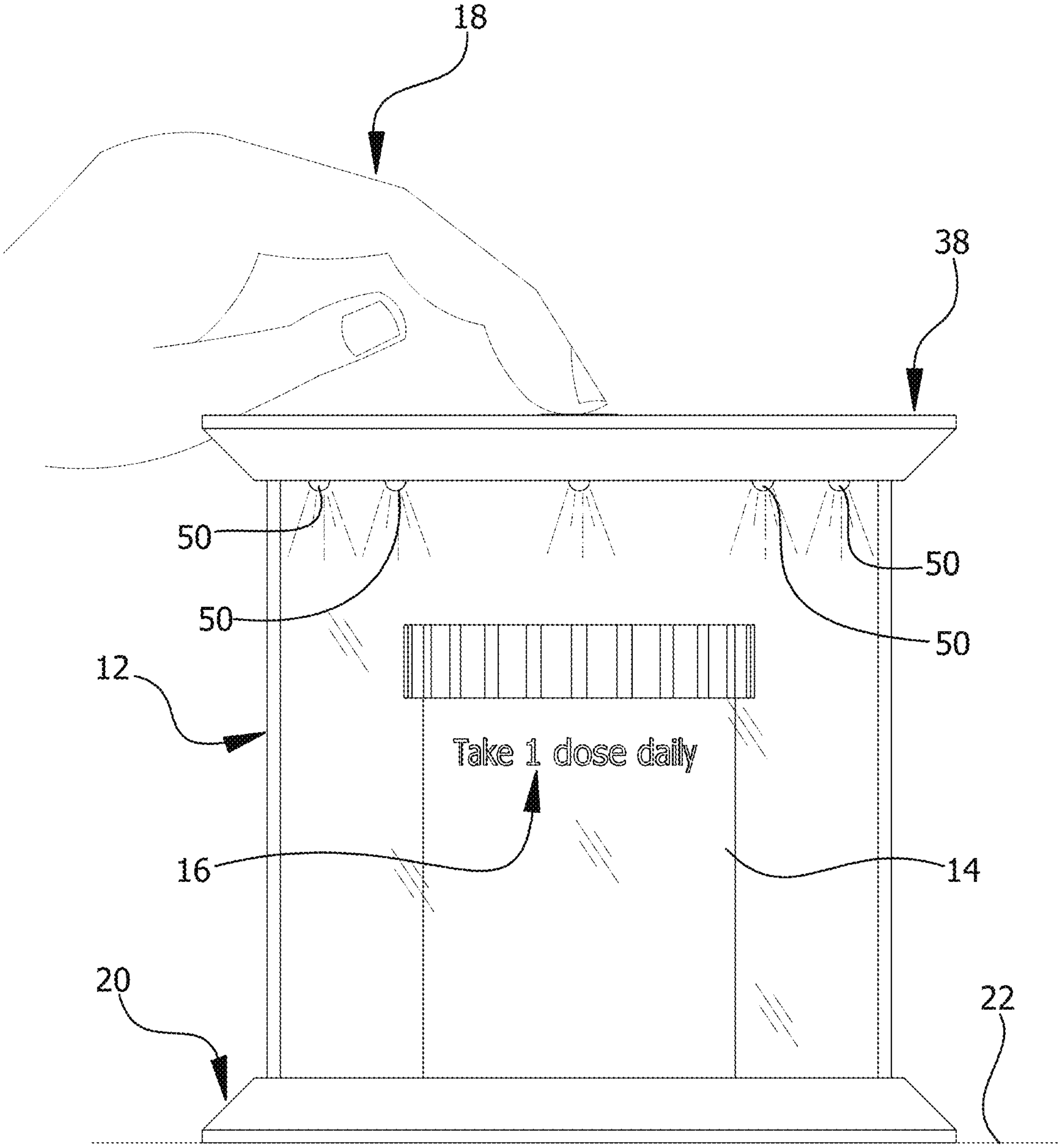
FIG. 5 is a perspective in-use view of an embodiment of the disclosure.

With reference now to the drawings, and in particular to FIGS. 1 through 5 thereof, a new magnifier device embodying the principles and concepts of an embodiment of the disclosure and generally designated by the reference numeral 10 will be described.

As best illustrated in FIGS. 1 through 5, the pill bottle magnifier device 10 generally comprises a jar 12 which can insertably receive a pill bottle 14. The pill bottle 14 may be a pill bottle of any conventional design that contains a prescription medication or the like. The jar 12 is comprised of a translucent material, including but not being limited to glass or polycarbonate, such that light passes through the jar 12 having the pill bottle 14 be visible in the jar 12.

Furthermore, the translucent material is structured into a convex shape to magnify a label 16 on the pill bottle 14 such that a user 18 can read the label 16. The user 18 may be an individual with limited vision, for example, who would have difficulty with reading the label 16 on the pill bottle 14.

A base 20 is provided and the jar 12 is coupled to the base 20 having the base 20 resting on a support surface 22. The support surface 22 may be a table top, for example, or other type of horizontal support surface 22 upon which the pill bottle 14 may be commonly positioned. The base 20 has a top surface 24 and a bottom surface 26 and an outer surface 28 sloping outwardly between the top surface 24 and the bottom surface 26 such that the top surface 24 has a diameter which is less than a diameter of the bottom surface 26. Additionally, the base 20 has a slot 30 extending downwardly in the top surface 24 and the slot 30 is continuously arcuate about a center of the top surface 24 such that the slot 30 defines a circle.

The jar 12 has a bottom edge 32 and the bottom edge 32 is positioned in the slot 30. Additionally, the slot 30 is spaced inwardly from the outer surface 28 such that the jar 12 is centrally positioned on the base 20 when the bottom edge 32 is positioned in the slot 30. Furthermore, the base 20 inhibits the jar 12 from tipping on the support surface 22. The jar 12 has a top edge 34 and an outer wall 36 extending between the top edge 34 and the bottom edge 32. Additionally, the outer wall 36 is convex between the top edge 34 and the bottom edge 32 such that the outer wall 36 magnifies the label 16 on the pill bottle 14 when the pill bottle 14 is positioned in the jar 12.

A lid 38 is positionable upon the jar 12 to contain the pill bottle 14 in the jar 12. The lid 38 has a lower surface 42 and an upper surface 40 and an exterior surface 44 sloping outwardly between the lower surface 42 and the upper surface 40 such that the lower surface 42 has a diameter is less than a diameter of the upper surface 40. Additionally, the lower surface 42 rests upon the top edge 34 of the jar 12 when the lid 38 is positioned on the jar 12. The lid 38 has a well 46 extending downwardly into the upper surface 40 and the well 46 is offset from a center of the upper surface 40. A plurality of contacts 48 is provided and each contact 48 of the plurality of contacts 48 is positioned in the well 46. Additionally, each contact 48 of the plurality of contacts 48 is positioned on opposite ends of the well 46 with respect to each other.

A plurality of lights 50 is each coupled to the lid 38 to emit light outwardly from the jar 12. Each light 50 of the plurality of lights 50 is directed into the jar 12 when the lid 38 is positioned on the jar 12 to illuminate the label 16 on the jar 12 when the plurality of lights 50 is turned on. Additionally, each light 50 of the plurality of lights 50 is positioned on the lower surface 42 of the lid 38 such that the plurality of lights 50 is positioned in the jar 12 when the lid 38 is positioned on the jar 12. The plurality of lights 50 is evenly spaced apart from each other and is distributed in a circle on the lower surface 42 of the lid 38 such that the plurality of evenly illuminates the pill bottle 14. In addition, the plurality of lights 50 is spaced inwardly from an intersection between the exterior surface 44 of the lid 38 and the lower surface 42 of the lid 38 such that the plurality of lights 50 is spaced inwardly from the outer wall 36 of the jar 12 when the lid 38 is positioned on the top edge 34 of the jar 12. Each light 50 of the plurality of lights 50 may comprise a light emitting diode or other type of electronic light emitter.

A power button 52 is movably integrated into the upper surface 40 of the lid 38 and the power button 52 can be depressed by the user 18. The power button 52 is in electrical communication with each light 50 of the plurality of lights 50. Each light 50 of the plurality of lights 50 is turned on when the power button 52 is depressed an initial time. Conversely, each light 50 of the plurality of lights 50 is turned off when the power button 52 is depressed a subsequent time. The power button 52 is offset from a center 54 of the upper surface 40 of the lid 38. Additionally, the power button 52 has an exposed surface 56 with respect to the upper surface 40 of the lid 38 and the power button 52 has indicia 58 applied to the exposed surface 56. Furthermore, the indicia 58 comprise an image of a power symbol 60 which may include a circle and a line which extends through a break in the circle.

A power supply 62 is removably positioned in the well 46 in the upper surface 40 of the lid 38. The power supply 62 is in electrical communication with the power button 52 when the power supply 62 is positioned in the well 46. Additionally, the power supply 62 comprises at least one battery 64 which is positionable in the well 46 in the upper surface 40 of the lid 38. Each contact 48 of the plurality of contacts 48 in the well 46 is in electrical communication with the power button 52.

Each contact 48 of the plurality of contacts 48 is comprised of an electrically conductive material, including but not being limited to copper or gold. The at least one battery 64 is in electrical communication with each contact 48 of the plurality of contacts 48 when the at least one battery 64 is positioned in the well 46 such that the at least one battery 64 is in electrical communication with the power button 52. A battery cover 66 is removably coupled to the upper surface 40 of the lid 38 such that the battery cover 66 closes the well 46 in the upper surface 40 of the lid 38 to contain the at least one battery 64 in the well 46.

In use, the pill bottle 14 is positioned in the jar 12 and the jar 12 magnifies the label 16 on the pill bottle 14 such that the user 18 can easily read the label 16. The lid 38 is positioned on the jar 12 to contain the pill bottle 14 in the jar 12. The user 18 depresses the power button 52 to turn on the plurality of lights 50 such that the label 16 is illuminated to assist the user 18 with reading the label 16 in the event that the jar 12 is located in a darkened environment. The power button is depressed a subsequent time to turn on the plurality of lights 50. The lid 38 is removed from the jar 12 such that the user 18 can remove the pill bottle 14 from the jar 12 to take medication that is contained in the pill bottle 14. Additionally, the pill bottle 14 is replaced in the jar 12 when the user 18 has taken the medication and the lid 38 is replaced on the jar 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pill bottle magnifier device for magnifying a label on a pill bottle, said device comprising:
- a jar being configured to insertably receive the pill bottle, said jar being comprised of a translucent material wherein said jar is configured to pass light through said jar having the pill bottle being visible in the jar, said translucent material being structured into a convex shape wherein said jar is configured to magnify the label on the pill bottle such that a user can read the label;
- a base having said jar being coupled to said base wherein said base is configured to rest on a support surface;
- a lid being positionable upon said jar wherein said lid is configured to contain the pill bottle in said jar; and
- a plurality of lights, each light of said plurality of lights being coupled to said lid wherein each light of said plurality of lights is configured to emit light outwardly from said jar, each light of said plurality of lights being directed into said jar when said lid is positioned on said jar wherein said plurality of lights is configured to illuminate the label on the pill bottle when said plurality of lights is turned on, said plurality of lights being arranged into a ring inset from a periphery of said lid.

2. The device according to claim 1, further comprising:
- said base having a top surface and a bottom surface and an outer surface sloping outwardly between said top surface and said bottom surface such that said top surface has a diameter being less than a diameter of said bottom surface;
- said base having a slot extending downwardly in said top surface; and
- said slot being continuously arcuate about a center of said top surface such that said slot defines a circle.

3. The device according to claim 2, further comprising:
- said jar having a bottom edge; and
- said bottom edge being positioned in said slot.

4. The device according to claim 3, further comprising said slot being spaced inwardly from said outer surface such that said jar is centrally positioned on said base when said bottom edge is positioned in said slot wherein said base is configured to inhibit said jar from tipping on the support surface.

5. The device according to claim 1, further comprising:
- said jar having a top edge and a bottom edge and an outer wall extending between said top edge and said bottom edge; and
- said outer wall being convex between said top edge and said bottom edge wherein said outer wall is configured to magnify the label on the pill bottle when the pill bottle is positioned in said jar.

6. The device according to claim 1, further comprising:
- said jar having a top edge;
- said lid having a lower surface and an upper surface and an exterior surface sloping outwardly between said lower surface and said upper surface such that said lower surface has a diameter being less than a diameter of said upper surface;
- said lower surface resting upon said top edge of said jar when said lid is positioned on said jar;
- said lid having a well extending downwardly into said upper surface; and
- said well being offset from a center of said upper surface.

7. The device according to claim 6, further comprising each light of said plurality of lights being positioned on said lower surface of said lid such that said plurality of lights is positioned in said jar when said lid is positioned on said jar.

8. The device according to claim 6, further comprising said plurality of lights being evenly spaced apart from each other and being distributed in a circle on said lower surface of said lid wherein said plurality of lights is configured to evenly illuminate the pill bottle.

9. The device according to claim 6, further comprising:
- said jar having an outer wall; and
- said plurality of lights being spaced inwardly from an intersection between said exterior surface of said lid and said lower surface of said lid such that said plurality of lights is spaced inwardly from said outer wall of said jar when said lid is positioned on said top edge of said jar.

10. The device according to claim 6, further comprising:
- a power button being movably integrated into said upper surface of said lid wherein said power button is configured to be depressed by the user;
- said power button being in electrical communication with each light of said plurality of lights;
- each light of said plurality of lights being turned on when said power button is depressed an initial time;
- each light of said plurality of lights being turned off when said power button is depressed a subsequent time; and
- said power button being offset from a center of said upper surface of said lid.

11. The device according to claim 10, further comprising:
- a power supply being removably positioned in said well in said upper surface of said lid;
- said power supply being in electrical communication with said power button when said power supply is positioned in said well; and
- said power supply comprising at least one battery being positionable in said well in said upper surface of said lid.

12. The device according to claim 11, further comprising:
- a plurality of contacts;
- each contact of said plurality of contacts being positioned in said well; and
- each contact of said plurality of contacts being positioned on opposite ends of said well with respect to each other;
- each contact of said plurality of contacts in said well being in electrical communication with said power button;
- each contact of said plurality of contacts being comprised of an electrically conductive material; and
- said at least one battery being in electrical communication with each contact of said plurality of contacts when said at least one battery is positioned in said well such that said at least one battery is in electrical communication with said power button.

13. The device according to claim 11, further comprising a battery cover being removably coupled to said upper surface of said lid such that said battery cover closes said well in said upper surface of said lid to contain said at least one battery in said well.

14. A pill bottle magnifier device for magnifying a label on a pill bottle, said device comprising:
- a jar being configured to insertably receive the pill bottle, said jar being comprised of a translucent material wherein said jar is configured to pass light through said jar having the pill bottle being visible in the jar, said translucent material being structured into a convex shape wherein said jar is configured to magnify the label on the pill bottle such that a user can read the label;

a base having said jar being coupled to said base wherein said base is configured to rest on a support surface, said base having a top surface and a bottom surface and an outer surface sloping outwardly between said top surface and said bottom surface such that said top surface has a diameter being less than a diameter of said bottom surface, said base having a slot extending downwardly in said top surface, said slot being continuously arcuate about a center of said top surface such that said slot defines a circle, said jar having a bottom edge, said bottom edge being positioned in said slot, said slot being spaced inwardly from said outer surface such that said jar is centrally positioned on said base when said bottom edge is positioned in said slot wherein said base is configured to inhibit said jar from tipping on the support surface, said jar having a top edge and an outer wall extending between said top edge and said bottom edge, said outer wall being convex between said top edge and said bottom edge wherein said outer wall is configured to magnify the label on the pill bottle when the pill bottle is positioned in said jar;

a lid being positionable upon said jar wherein said lid is configured to contain the pill bottle in said jar, said lid having a lower surface and an upper surface and an exterior surface sloping outwardly between said lower surface and said upper surface such that said lower surface has a diameter being less than a diameter of said upper surface, said lower surface resting upon said top edge of said jar when said lid is positioned on said jar, said lid having a well extending downwardly into said upper surface, said well being offset from a center of said upper surface;

a plurality of contacts, each contact of said plurality of contacts being positioned in said well, each contact of said plurality of contacts being positioned on opposite ends of said well with respect to each other;

a plurality of lights, each light of said plurality of lights being coupled to said lid wherein each light of said plurality of lights is configured to emit light outwardly from said jar, each light of said plurality of lights being directed into said jar when said lid is positioned on said jar wherein said plurality of lights is configured to illuminate the label on the pill bottle when said plurality of lights is turned on, each light of said plurality of lights being positioned on said lower surface of said lid such that said plurality of lights is positioned in said jar when said lid is positioned on said jar, said plurality of lights being evenly spaced apart from each other and being distributed in a circle on said lower surface of said lid wherein said plurality of lights is configured to evenly illuminate the pill bottle, said plurality of lights being spaced inwardly from an intersection between said exterior surface of said lid and said lower surface of said lid such that said plurality of lights is spaced inwardly from said outer wall of said jar when said lid is positioned on said top edge of said jar;

a power button being movably integrated into said upper surface of said lid wherein said power button is configured to be depressed by the user, said power button being in electrical communication with each light of said plurality of lights, each light of said plurality of lights being turned on when said power button is depressed an initial time, each light of said plurality of lights being turned off when said power button is depressed a subsequent time, said power button being offset from a center of said upper surface of said lid;

a power supply being removably positioned in said well in said upper surface of said lid, said power supply being in electrical communication with said power button when said power supply is positioned in said well, said power supply comprising at least one battery being positionable in said well in said upper surface of said lid, each contact of said plurality of contacts in said well being in electrical communication with said power button, each contact of said plurality of contacts being comprised of an electrically conductive material, said at least one battery being in electrical communication with each contact of said plurality of contacts when said at least one battery is positioned in said well such that said at least one battery is in electrical communication with said power button; and a battery cover being removably coupled to said upper surface of said lid such that said battery cover closes said well in said upper surface of said lid to contain said at least one battery in said well.

15. A pill bottle magnifier device for magnifying a label on a pill bottle, said device comprising:

said label being applied to an outside wall of said pill bottle;

a jar being configured to insertably receive said pill bottle, said jar being comprised of a translucent material wherein said jar is configured to pass light through said jar having said pill bottle being visible in the jar, said translucent material being structured into a convex shape wherein said jar is configured to magnify said label on said pill bottle such that a user can read said label;

a base having said jar being coupled to said base wherein said base is configured to rest on a support surface, said base having a top surface and a bottom surface and an outer surface sloping outwardly between said top surface and said bottom surface such that said top surface has a diameter being less than a diameter of said bottom surface, said base having a slot extending downwardly in said top surface, said slot being continuously arcuate about a center of said top surface such that said slot defines a circle, said jar having a bottom edge, said bottom edge being positioned in said slot, said slot being spaced inwardly from said outer surface such that said jar is centrally positioned on said base when said bottom edge is positioned in said slot wherein said base is configured to inhibit said jar from tipping on the support surface, said jar having a top edge and an outer wall extending between said top edge and said bottom edge, said outer wall being convex between said top edge and said bottom edge, said outer wall magnifying said label on said pill bottle when said pill bottle is positioned in said jar;

a lid being positionable upon said jar to contain said pill bottle in said jar, said lid having a lower surface and an upper surface and an exterior surface sloping outwardly between said lower surface and said upper surface such that said lower surface has a diameter being less than a diameter of said upper surface, said lower surface resting upon said top edge of said jar when said lid is positioned on said jar, said lid having a well extending downwardly into said upper surface, said well being offset from a center of said upper surface;

a plurality of contacts, each contact of said plurality of contacts being positioned in said well, each contact of said plurality of contacts being positioned on opposite ends of said well with respect to each other;

a plurality of lights, each light of said plurality of lights being coupled to said lid wherein each light of said plurality of lights is configured to emit light outwardly from said jar, each light of said plurality of lights being directed into said jar when said lid is positioned on said jar wherein said plurality of lights is configured to illuminate said label on said pill bottle when said plurality of lights is turned on, each light of said plurality of lights being positioned on said lower surface of said lid such that said plurality of lights is positioned in said jar when said lid is positioned on said jar, said plurality of lights being evenly spaced apart from each other and being distributed in a circle on said lower surface of said lid wherein said plurality of lights is configured to evenly illuminate the pill bottle, said plurality of lights being spaced inwardly from an intersection between said exterior surface of said lid and said lower surface of said lid such that said plurality of lights is spaced inwardly from said outer wall of said jar when said lid is positioned on said top edge of said jar;

a power button being movably integrated into said upper surface of said lid wherein said power button is configured to be depressed by the user, said power button being in electrical communication with each light of said plurality of lights, each light of said plurality of lights being turned on when said power button is depressed an initial time, each light of said plurality of lights being turned off when said power button is depressed a subsequent time, said power button being offset from a center of said upper surface of said lid;

a power supply being removably positioned in said well in said upper surface of said lid, said power supply being in electrical communication with said power button when said power supply is positioned in said well, said power supply comprising at least one battery being positionable in said well in said upper surface of said lid, each contact of said plurality of contacts in said well being in electrical communication with said power button, each contact of said plurality of contacts being comprised of an electrically conductive material, said at least one battery being in electrical communication with each contact of said plurality of contacts when said at least one battery is positioned in said well such that said at least one battery is in electrical communication with said power button; and a battery cover being removably coupled to said upper surface of said lid such that said battery cover closes said well in said upper surface of said lid to contain said at least one battery in said well.

* * * * *